B. V. NORDBERG.
ENGINE VALVE.
APPLICATION FILED DEC. 2, 1907.

914,747.

Patented Mar. 9, 1909.
2 SHEETS—SHEET 2.

UNITED STATES PATENT OFFICE.

BRUNO V. NORDBERG, OF MILWAUKEE, WISCONSIN.

ENGINE-VALVE.

No. 914,747.  Specification of Letters Patent.  Patented March 9, 1909.

Application filed December 2, 1907. Serial No. 404,717.

*To all whom it may concern:*

Be it known that I, BRUNO V. NORDBERG, a citizen of the United States, residing at Milwaukee, in the county of Milwaukee and State of Wisconsin, have invented certain new and useful Improvements in Engine-Valves, of which the following is a specification, reference being had to the accompanying drawing, forming a part thereof.
This invention relates more particularly to oscillating or rocking engine valves. Its main objects are to obtain a quick and ample initial opening of the ports by a comparatively small movement of the valves and thus provide for running engines equipped with this kind of valves at higher speeds; to reduce leakage in multiported valves; to reduce the clearance space, and thus economize power; and generally to improve the construction and operation of valves of this class.

It consists in certain novel features of construction and in the peculiar arrangement and combinations of parts as hereinafter particularly described and pointed out in the claims.

Figure 1:
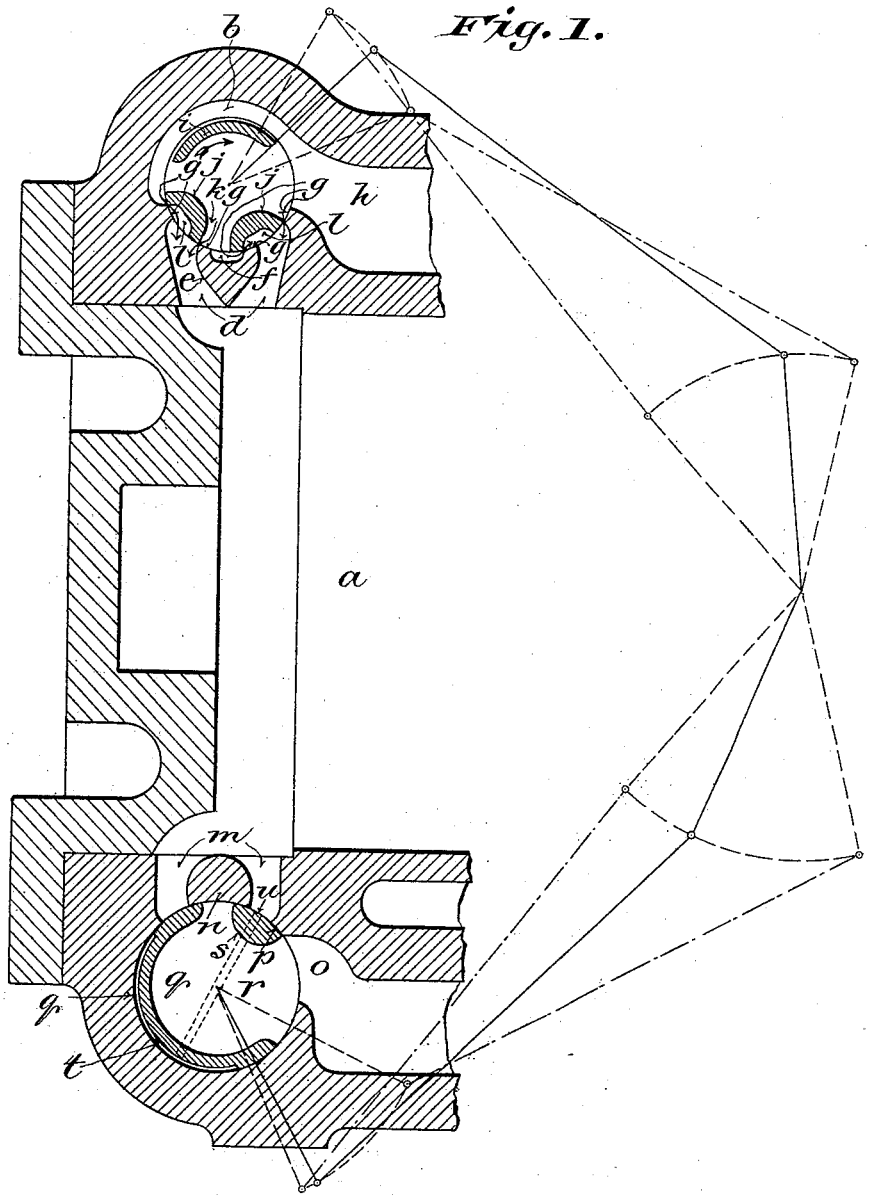
Figure 2:
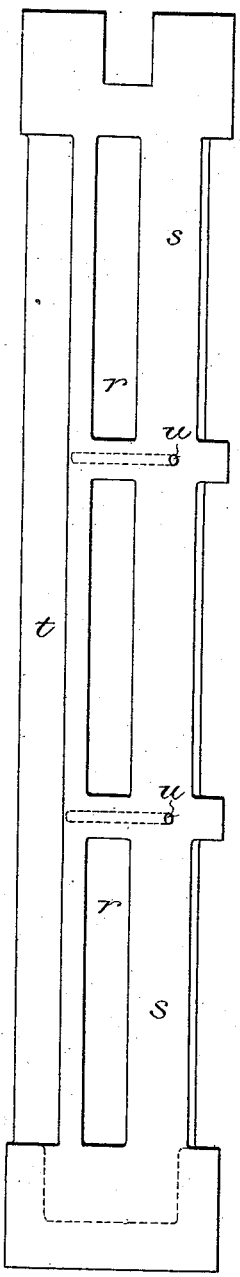
Figure 3:
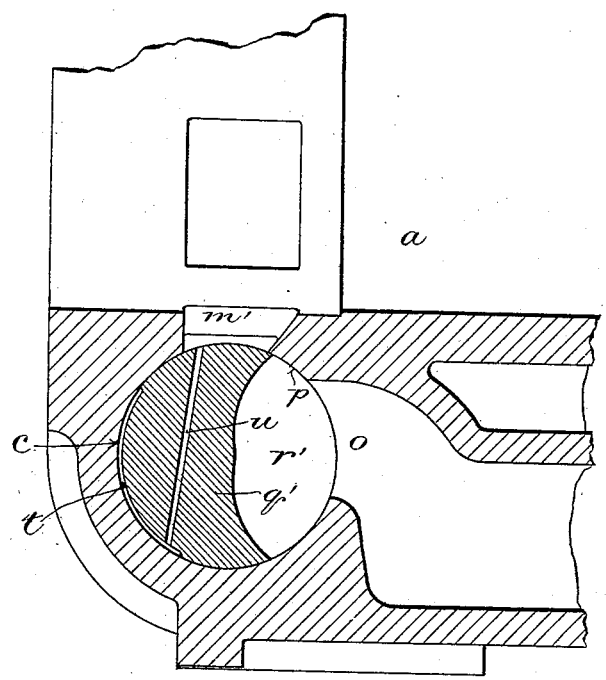

In the accompanying drawing like characters designate the same parts in the several figures.
Figure 1 is an axial section of one end of an engine provided with inlet and exhaust valves embodying the present invention, the section cutting the valves and valve chambers transversely to their axes; Fig. 2 is an enlarged plan view of the exhaust valve shown in Fig. 1; and Fig. 3 is an enlarged section like that of Fig. 1, showing a modification of the exhaust valve.

Referring to Fig. 1, $a$ designates an engine cylinder provided with an inlet valve chamber $b$ and an exhaust valve chamber $c$, which are generally of cylindrical form and arranged transversely to the axis of the cylinder. The inlet valve chamber $b$ is connected with the cylinder by ports $d$ which are separated from each other by a partition $e$ having a cavity $f$ opening into the valve chamber, and on opposite sides of said cavity, valve seats $g$. On the opposite sides of the ports the valve chamber is formed with similar seats $g$. A steam or other fluid supply connection $h$, opens into the chamber $b$. An oscillating or rocking inlet valve $i$, fitted in said chamber, is formed with members $j$, separated from each other by a passage $k$, and each having a cavity $l$ between working faces which are accurately fitted to the seats $g$. The cavity $f$ is of greater width than the valve face with which it coöperates, and each cavity $l$ is of greater width than the seat over which it moves in opening. For the purpose of illustration, an inlet valve is shown having two inlet ports and two members, but valves having a greater number of ports and a corresponding number of members, may be employed. The valve is shown just at the point of opening or closing, and from this it will be observed that the cut-off edges of the working faces of each member $j$ are the same distance apart as the cut-off edges of the seats $g$, with which they coöperate. These edges are also parallel with each other. It will also be observed that the valve is in effect equivalent to one having four ports since it opens and closes simultaneously at four places, but unlike an ordinary four-ported valve of the gridiron type which would have eight points or lines of leakage, it has but four points or lines of leakage, so that the construction shown and described as compared with that of other multiported valves, materially reduces leakage.

As shown in the same figure, the exhaust valve chamber $c$ is connected with the cylinder by two ports $m$, which are separated from each other by a partition $n$. The exhaust chest or passage of the cylinder communicates with said chamber through a port $o$, and said chamber is formed between said port and the adjacent port $m$ with a seat $p$. An oscillating or rocking exhaust valve $q$, fitted in said chamber, is formed with a cavity or passage $r$ for connecting the cylinder ports $m$ with the port $o$ when the valve is opened. It is also formed with a member $s$ having a face adapted to cover the port $m$ next to the port $o$ when the valve is closed. On the side opposite the seat $p$ the valve is formed with a shallow cavity $t$ communicating with the cylinder through restricted passages $u$ and one of the ports $m$ when the valve is closed, for holding the working face of the valve snugly against the seat $p$ between the ports $m$ and port $o$, and preventing leakage between them when the valve is closed, as shown.

The cavity $t$ and passages $u$ are made of small capacity, so that in practice they will be filled with oil and water of condensation, thus excluding steam and avoiding the waste of heat and power which would result from the admission of steam into and its condensation in a cavity of larger capacity every time the valve closed and opened.

By connecting each of the valve chambers with the cylinder by a plurality of ports and providing each valve with corresponding members or faces for covering said ports, a quick and ample initial opening of the valves is obtained by a comparatively small movement, and the engine may be run at a higher rate of speed.

The movements of the valves and of their operating connections are diagrammatically indicated on Fig. 1, the positions of the valve arms and of their connections with the wrist plate corresponding with the positions in which the valves are shown, being indicated by full lines, while the extreme positions of said arms and their connections with the wrist plate are indicated by dotted lines.

Referring to Fig. 3, showing a modification of the exhaust valve, the valve chamber is connected with the cylinder by a single port $m'$ instead of by a number of ports, and the cavity or passage $r'$ in the valve $q'$ has but one opening through its face for connecting the single cylinder port $m'$ with the exhaust port $o$. In other respects it is essentially like the valve $q$ in principle and operation. The fluid filling the cavity $t$ and passages $u$ being subjected to the pressure within the cylinder when the valve is closed, holds the working face of the valve snugly against the seat between the ports $m'$ and $o$ and prevents leakage between them.

Both forms of the valve shown are adapted to cover the cylinder port or ports in closing, and thereby exclude the valve cavity or passage from the clearance space of the engine, thus materially reducing the clearance space.

Except as hereinbefore stated, the operation of the valves is like or similar to that of ordinary Corliss or rocking valves, and being understood by those familiar with the art to which this invention pertains, need not be further or particularly explained.

Various changes in details of construction and arrangement of parts may be made without materially affecting the operation of the valves and without departing from the principle and intended scope of the invention.

I claim:

1. In an engine the combination of a cylinder, a valve chamber connected therewith by ports which are separated by a partition having a cavity opening into said chamber, and a rocking valve having members separated by a passage and adapted to cover said ports, each member being formed with a cavity of greater width than the seat face over which it moves in opening, substantially as described.

2. In an engine the combination of a cylinder, a valve chamber connected therewith by ports which are separated from each other by a partition having a cavity opening into said chamber, and a rocking valve having members separated from each other by a passage and each formed with a cavity in its working face, the valve chamber having seats at the sides of said ports and the cavity in said partition being of greater width than the valve face which moves over it in opening, substantially as described.

3. In an engine the combination of a cylinder, an inlet valve chamber connected therewith by ports which are separated from each other by a partition having a cavity opening into said chamber, said chamber having seats at the sides of said ports, and a rocking valve having members separated from each other by a passage and each formed with a cavity in its working face of greater width than the seat face over which it moves in opening, the cut-off edges of each valve member being the same distance apart as the cut-off edges of the seats with which they work, substantially as described.

4. In an engine the combination of a cylinder, a valve chamber having a cylinder port and an exhaust port with a seat between them, and a rocking valve adapted in closing to cover the cylinder port and having a cavity or passage adapted in opening to connect said ports, and a cavity of greater area than the cylinder port and approximately opposite said seat, said cavity communicating with the cylinder and adapted to contain fluid under pressure whereby the valve face is held tightly against said seat when the valve is closed, substantially as described.

5. In an engine the combination of a cylinder, a valve chamber connected with a cylinder by a number of ports, and having an exhaust port separated by a valve seat from the adjacent cylinder port, a rocking valve having separated faces adapted to cover the cylinder ports in closing, a cavity or passage for connecting said ports when the valve is opened, and a cavity of greater area than the cylinder ports and approximately opposite said seat, said cavity communicating with the cylinder and being adapted to contain fluid under pressure whereby the valve face is held tightly against the seat between the cylinder ports and the exhaust port when the valve is closed, substantially as described.

6. In an engine the combination of a cylinder, an inlet valve chamber connected therewith by ports which are separated therefrom by a partition having a cavity opening into said chamber, an exhaust valve chamber having a cylinder port and an exhaust port with a seat between them, a rocking valve having members separated by a passage and adapted to cover the inlet ports, each member being formed with a cavity of greater width than the seat face over which it moves in opening, and a rocking valve adapted in closing to cover the cylinder port of the exhaust valve chamber and having a cavity or passage adapted to connect said port with the exhaust port in opening, substantially as described.

7. In an engine the combination of a cylinder, an inlet valve chamber having cylinder ports and valve seats at the sides of the ports which are separated by a partition having a cavity opening into said chamber between the seats thereon, a rocking valve having members separated from each other by a passage and each formed with a cavity in its working face, the cavity in said partition being of greater width than the valve face which moves over it in closing, an exhaust valve chamber having a cylinder port and an exhaust port with a seat between them, and a rocking valve adapted in closing to cover said cylinder port and having a cavity or passage adapted in opening to connect said port with the exhaust port, and a cavity communicating with the cylinder when the valve is closed and adapted to hold the valve face tightly against the seat between the cylinder and exhaust ports, substantially as described.

In witness whereof I hereto affix my signature in presence of two witnesses.

BRUNO V. NORDBERG.

Witnesses:
  CHAS. L. GOSS,
  E. H. HOLMES.